US008683109B2

(12) United States Patent
Nakayama et al.

(10) Patent No.: US 8,683,109 B2
(45) Date of Patent: *Mar. 25, 2014

(54) COMPUTER SYSTEM AND BUS ASSIGNMENT METHOD

(71) Applicant: Hitachi, Ltd., Tokyo (JP)

(72) Inventors: Keishi Nakayama, Tokyo (JP); Keitaro Uehara, Tokyo (JP); Takashi Aoyagi, Tokyo (JP); Shinichiro Toya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,515

(22) Filed: Jan. 3, 2013

(65) Prior Publication Data

US 2013/0124775 A1     May 16, 2013

Related U.S. Application Data

(63) Continuation of application No. 12/486,927, filed on Jun. 18, 2009, now Pat. No. 8,352,665.

(30) Foreign Application Priority Data

Aug. 5, 2008 (JP) .................. 2008-201983

(51) Int. Cl.
    *G06F 13/20*     (2006.01)
    *G06F 3/00*     (2006.01)
    *G06F 13/36*     (2006.01)
    *G06F 13/00*     (2006.01)

(52) U.S. Cl.
    USPC ............... 710/313; 710/9; 710/306; 710/316

(58) Field of Classification Search
    USPC ....................... 710/9, 306, 313, 316
    See application file for complete search history.

(56) References Cited

U.S. PATENT DOCUMENTS

| 5,018,133 A | 5/1991 | Tsukakoshi et al. |
| 5,542,055 A * | 7/1996 | Amini et al. .......... 710/306 |

(Continued)

FOREIGN PATENT DOCUMENTS

| JP | 10-178626 A | 6/1998 | |
| JP | 10178626 A * | 6/1998 | ............... H04N 7/16 |

(Continued)

OTHER PUBLICATIONS

Haojun Luo; Hui, J.Y.; Fayoumi, A.G., "A low power and delay multi-protocol switch with IO and network virtualization," High Performance Switching and Routing (HPSR), 2013 IEEE 14th International Conference on , pp. 35,42, Jul. 8-11, 2013.*

(Continued)

*Primary Examiner* — Faisal M Zaman
(74) *Attorney, Agent, or Firm* — Mattingly & Malur, PC

(57) ABSTRACT

To make it possible to take over an IO configuration that is assigned to logical partitions in reallocation of the logical partitions, and to make an IO access work normally. A computer system has a server having an IO bridge, a switch that has a first IO bridge for connecting with the IO bridge of the server through a bus and plural second IO bridges for connecting to plural IO devices through a bus, and bus number assignment management means for fixedly assigning mutually different PCI bus numbers to the plural second IO bridges.

15 Claims, 18 Drawing Sheets

(56) References Cited

U.S. PATENT DOCUMENTS

| | | | |
|---|---|---|---|
| 5,857,086 A | 1/1999 | Horan et al. | |
| 5,859,989 A | 1/1999 | Olarig et al. | |
| 5,933,614 A | 8/1999 | Tavallaei et al. | |
| 5,974,474 A | 10/1999 | Furner et al. | |
| 6,094,700 A | 7/2000 | Deschepper et al. | |
| 6,098,114 A | 8/2000 | McDonald et al. | |
| 6,189,050 B1 | 2/2001 | Sakarda | |
| 6,233,634 B1 | 5/2001 | Clark et al. | |
| 6,332,180 B1* | 12/2001 | Kauffman et al. | 711/153 |
| 6,397,268 B1* | 5/2002 | Cepulis | 710/8 |
| 6,418,492 B1 | 7/2002 | Papa et al. | |
| 6,430,626 B1 | 8/2002 | Witkowski et al. | |
| 6,542,953 B2* | 4/2003 | Porterfield | 710/305 |
| 6,557,068 B2 | 4/2003 | Riley et al. | |
| 6,594,722 B1 | 7/2003 | Willke, II et al. | |
| 6,625,673 B1 | 9/2003 | Dickey et al. | |
| 6,636,904 B2 | 10/2003 | Fry et al. | |
| 6,647,453 B1 | 11/2003 | Duncan et al. | |
| 6,662,242 B2* | 12/2003 | Holm et al. | 710/9 |
| 6,665,759 B2 | 12/2003 | Dawkins et al. | |
| 6,668,299 B1* | 12/2003 | Kagan et al. | 710/305 |
| 6,732,067 B1 | 5/2004 | Powderly | |
| 6,748,478 B1 | 6/2004 | Burke et al. | |
| 6,785,892 B1* | 8/2004 | Miller et al. | 719/313 |
| 6,820,149 B2* | 11/2004 | Moy | 710/104 |
| 6,823,418 B2 | 11/2004 | Langendorf et al. | |
| 6,865,618 B1 | 3/2005 | Hewitt et al. | |
| 6,985,990 B2 | 1/2006 | Bronson et al. | |
| 7,219,183 B2 | 5/2007 | Pettey et al. | |
| 7,308,551 B2 | 12/2007 | Arndt et al. | |
| 7,334,071 B2* | 2/2008 | Onufryk et al. | 710/312 |
| 7,363,404 B2 | 4/2008 | Boyd et al. | |
| 7,366,798 B2 | 4/2008 | Nordstrom et al. | |
| 7,809,977 B2 | 10/2010 | Takamoto | |
| 7,890,669 B2 | 2/2011 | Uehara et al. | |
| 7,991,839 B2 | 8/2011 | Freimuth et al. | |
| 8,051,254 B2 | 11/2011 | Suzuki | |
| 8,352,665 B2* | 1/2013 | Nakayama et al. | 710/313 |
| 2002/0016891 A1* | 2/2002 | Noel et al. | 711/153 |
| 2002/0052914 A1* | 5/2002 | Zalewski et al. | 709/203 |
| 2002/0169918 A1 | 11/2002 | Piatetsky et al. | |
| 2003/0005207 A1* | 1/2003 | Langendorf et al. | 710/306 |
| 2003/0012204 A1 | 1/2003 | Czeiger et al. | |
| 2003/0037199 A1 | 2/2003 | Solomon et al. | |
| 2004/0003063 A1* | 1/2004 | Ashok et al. | 709/221 |
| 2004/0039986 A1 | 2/2004 | Solomon et al. | |
| 2004/0103210 A1 | 5/2004 | Fujii et al. | |
| 2004/0260857 A1* | 12/2004 | Henderson et al. | 710/313 |
| 2005/0097384 A1 | 5/2005 | Uchara et al. | |
| 2005/0182788 A1* | 8/2005 | Arndt et al. | 707/103 R |
| 2005/0268065 A1* | 12/2005 | Awada et al. | 711/173 |
| 2006/0010278 A1 | 1/2006 | Dennis et al. | |
| 2006/0072728 A1 | 4/2006 | Cope et al. | |
| 2006/0106967 A1 | 5/2006 | Brocco et al. | |
| 2006/0123178 A1* | 6/2006 | Lueck et al. | 710/306 |
| 2006/0195715 A1 | 8/2006 | Herington | |
| 2006/0242353 A1* | 10/2006 | Torudbakken et al. | 710/316 |
| 2006/0242442 A1* | 10/2006 | Armstrong et al. | 713/400 |
| 2007/0165596 A1 | 7/2007 | Boyd et al. | |
| 2008/0065826 A1* | 3/2008 | Recio et al. | 711/113 |
| 2008/0117907 A1 | 5/2008 | Hein | |
| 2008/0162800 A1 | 7/2008 | Takashige et al. | |
| 2008/0256327 A1 | 10/2008 | Jacobs et al. | |
| 2009/0003245 A1 | 1/2009 | Wu et al. | |
| 2009/0282300 A1 | 11/2009 | Heyrman et al. | |
| 2009/0307456 A1* | 12/2009 | Patwari et al. | 711/173 |
| 2010/0312943 A1 | 12/2010 | Uehara et al. | |
| 2011/0004688 A1 | 1/2011 | Matthews et al. | |
| 2011/0029710 A1* | 2/2011 | Matthews et al. | 710/311 |

FOREIGN PATENT DOCUMENTS

| | | | | |
|---|---|---|---|---|
| JP | 2001-337909 A | | 12/2001 | |
| JP | 2002-49572 A | | 2/2002 | |
| JP | 2002-149592 A | | 5/2002 | |
| JP | 2004-531838 A | | 10/2004 | |
| JP | 2005-122640 A | | 5/2005 | |
| JP | 2005-250975 A | | 9/2005 | |
| JP | 2006-004381 A | | 1/2006 | |
| JP | 2006-178553 A | | 7/2006 | |
| JP | 2006-244481 A | | 9/2006 | |
| JP | 2008-21252 A | | 1/2008 | |
| JP | 2008-146566 A | | 6/2008 | |
| JP | 2008-171413 A | | 7/2008 | |
| JP | 2009181418 A | * | 8/2009 | G06F 13/14 |
| JP | 2009294828 A | * | 12/2009 | G06F 13/14 |
| JP | 2010039760 A | * | 2/2010 | G06F 13/10 |
| JP | 2010079816 A | * | 4/2010 | G06F 13/10 |
| JP | 2011-171951 A | | 9/2011 | |
| JP | 2011171951 A | * | 9/2011 | H04L 12/28 |
| JP | 2012150623 A | * | 8/2012 | G06F 13/14 |

OTHER PUBLICATIONS

Suzuki, J.; Hidaka, Y.; Higuchi, J.; Baba, T.; Kami, N.; Yoshikawa, T., "Multi-root Share of Single-Root I/O Virtualization (SR-IOV) Compliant PCI Express Device," High Performance Interconnects (HOTI), 2010 IEEE 18th Annual Symposium on , pp. 25,31, Aug. 18-20, 2010.*

Multi-Root I/O Virtualization and Sharing Specification Revision 1.0, 1.2.3. MR-IOV Topology, May 12, 2008, pp. 21-23.

"NN76043577: Error Recovery from Controller Failures in a Virtually Addressed Mass Storage System", Apr. 1, 1976, IBM, IBM Technical Disclosure Bulletin, vol. 18, Iss. 11, pp. 3577-3578.

"NN76043579: Generating Logical Unit Addresses Based Upon Interruption Signals", Apr. 1, 1976, IBM, IBM Technical Disclosure Bulletin, vol. 18, Iss. 11, pp. 3579-3580.

"NNRD428183: Mapping Large PCI Memory Windows on a Secondary Bus to Smaller Windows on a Primary Bus", Dec. 1, 1999, IBM, IBM Technical Disclosure Bulletin, Iss. 428, pp. 1730.

"NN9701133: Methodology for Software Peripheral Component Interconnect Frequency Selection", Jan. 1, 1997, IBM, IBM Technical Disclosure Bulletin, vol. 40, Iss. 1, pp. 133-134.

* cited by examiner

FIG. 4

SWITCH VS TABLE 610

| SWITCH | VS# | VALID | START VB# | NUMBER OF ENTRY |
|---|---|---|---|---|
| 301 | 1 | Yes | 1 | 3 |
|  | 2 | Yes | 8 | 3 |
|  | 3 | Yes | 15 | 2 |
| 302 | 4 | Yes | 22 | 3 |
|  | 5 | Yes | 29 | 3 |
|  | 6 | Yes | 36 | 2 |

FIG. 5

SWITCH VS BRIDGE TABLE 620

| SWITCH | VS# | VALID | DIRECTION | MAP | PORT# | VH# |
|---|---|---|---|---|---|---|
| 301 | 1 | Yes | up | Yes | 321A-1 | 0 |
| | 2 | Yes | down | Yes | 321B-1 | 0 |
| | 3 | Yes | down | No | - | - |
| | 4 | Yes | down | Yes | 321B-3 | 0 |
| | 5 | Yes | down | No | - | - |
| | 6 | Yes | down | No | - | - |
| | 7 | Yes | down | No | - | - |
| | 8 | Yes | up | Yes | 321A-2 | 0 |
| | 9 | Yes | down | No | - | - |
| | 10 | Yes | down | No | - | - |
| | 11 | Yes | down | No | - | - |
| | 12 | Yes | down | Yes | 321B-4 | 0 |
| | 13 | Yes | down | Yes | 321B-5 | 0 |
| | 14 | Yes | down | No | - | - |
| | 15 | Yes | up | Yes | 321A-3 | 0 |
| | 16 | Yes | down | No | - | - |
| | 17 | Yes | down | No | - | - |
| | 18 | Yes | down | No | - | - |
| | 19 | Yes | down | No | - | - |
| | 20 | Yes | down | No | - | - |
| | 21 | Yes | down | Yes | 321B-6 | 0 |
| 302 | 22 | Yes | up | Yes | 322A-1 | 0 |
| | 23 | Yes | down | Yes | 322B-1 | 0 |
| | 24 | Yes | down | Yes | 322B-2 | 0 |
| | 25 | Yes | down | No | - | - |
| | 26 | Yes | down | No | - | - |
| | 27 | Yes | down | No | - | - |
| | 28 | Yes | down | No | - | - |
| | 29 | Yes | up | Yes | 322A-2 | 0 |
| | 30 | Yes | down | No | - | - |
| | 31 | Yes | down | No | - | - |
| | 32 | Yes | down | Yes | 322B-3 | 0 |
| | 33 | Yes | down | Yes | 322B-4 | 0 |
| | 34 | Yes | down | No | - | - |
| | 35 | Yes | down | No | - | - |
| | 36 | Yes | up | Yes | 322A-3 | 0 |
| | 37 | Yes | down | No | - | - |
| | 38 | Yes | down | No | - | - |
| | 39 | Yes | down | No | - | - |
| | 40 | Yes | down | No | - | - |
| | 41 | Yes | down | Yes | 322B-5 | 0 |
| | 42 | Yes | down | No | - | - |

FIG. 6

BUS NUMBER ASSIGNMENT TABLE 630

| SWITCH | VB# | PBus# | SBus# | SubBus# |
|---|---|---|---|---|
| 301 | 1 | 1 | 2 | 8 |
| | 2 | 2 | 3 | 3 |
| | 3 | 2 | 4 | 4 |
| | 4 | 2 | 5 | 5 |
| | 5 | 2 | 6 | 6 |
| | 6 | 2 | 7 | 7 |
| | 7 | 2 | 8 | 8 |
| | 8 | 1 | 2 | 8 |
| | 9 | 2 | 3 | 3 |
| | 10 | 2 | 4 | 4 |
| | 11 | 2 | 5 | 5 |
| | 12 | 2 | 6 | 6 |
| | 13 | 2 | 7 | 7 |
| | 14 | 2 | 8 | 8 |
| | 15 | 1 | 2 | 8 |
| | 16 | 2 | 3 | 3 |
| | 17 | 2 | 4 | 4 |
| | 18 | 2 | 5 | 5 |
| | 19 | 2 | 6 | 6 |
| | 20 | 2 | 7 | 7 |
| | 21 | 2 | 8 | 8 |
| 302 | 22 | 9 | 10 | 16 |
| | 23 | 10 | 11 | 11 |
| | 24 | 10 | 12 | 12 |
| | 25 | 10 | 13 | 13 |
| | 26 | 10 | 14 | 14 |
| | 27 | 10 | 15 | 15 |
| | 28 | 10 | 16 | 16 |
| | 29 | 9 | 10 | 16 |
| | 30 | 10 | 11 | 11 |
| | 31 | 10 | 12 | 12 |
| | 32 | 10 | 13 | 13 |
| | 33 | 10 | 14 | 14 |
| | 34 | 10 | 15 | 15 |
| | 35 | 10 | 16 | 16 |
| | 36 | 9 | 10 | 16 |
| | 37 | 10 | 11 | 11 |
| | 38 | 10 | 12 | 12 |
| | 39 | 10 | 13 | 13 |
| | 40 | 10 | 14 | 14 |
| | 41 | 10 | 15 | 15 |
| | 42 | 10 | 16 | 16 |

Columns: 631, 632, 633, 634, 635

FIG. 7

| IO BRIDGE | Bus# | FIRST IO BRIDGE | VB# | Bus# | SECOND IO BRIDGE | VB# | Bus# | IO DEVICE |
|---|---|---|---|---|---|---|---|---|
| 641 | 642 | 643 | 644 | 645 | 646 | 647 | 648 | 649 |
| 141A | 1 | 321A-1 | 1 | 2 | 321B-1 | 2,9,16 | 3 | 501-1 |
| | | | | | 321B-2 | 3,10,17 | 4 | (501-2) |
| | | 321A-2 | 8 | | 321B-3 | 4,11,18 | 5 | 501-3 |
| | | | | | 321B-4 | 5,12,19 | 6 | 501-4 |
| | | 321A-3 | 15 | | 321B-5 | 6,13,20 | 7 | 501-5 |
| | | | | | 321B-6 | 7,14,21 | 8 | 501-6 |
| 141B | 9 | 322A-1 | 22 | 10 | 322B-1 | 23,30,37 | 11 | 502-1 |
| | | | | | 322B-2 | 24,31,38 | 12 | 502-2 |
| | | 322A-2 | 29 | | 322B-3 | 25,32,39 | 13 | 502-3 |
| | | | | | 322B-4 | 26,33,40 | 14 | 502-4 |
| | | 322A-3 | 36 | | 322B-5 | 27,34,41 | 15 | 502-5 |
| | | | | | 322B-6 | 28,35,42 | 16 | (502-6) |

FIG. 9

SWITCH PORT TABLE 600

| SWITCH | PORT# | DIRECTION | TYPE | LINK DESTINATION |
|---|---|---|---|---|
| 301 | 321A-1 | up | HOST | 141A |
| | 321A-2 | up | HOST | 142A |
| | 321A-3 | up | HOST | 143A |
| | 321B-1 | down | DEVICE | 501-1 |
| | 321B-2 | down | DEVICE | 501-2 |
| | 321B-3 | down | DEVICE | 501-3 |
| | 321B-4 | down | DEVICE | 501-4 |
| | 321B-5 | down | DEVICE | 501-5 |
| | 321B-6 | down | DEVICE | 501-6 |
| 302 | 322A-1 | up | HOST | 141B |
| | 322A-2 | up | HOST | 142B |
| | 322A-3 | up | HOST | 143B |
| | 322B-1 | down | DEVICE | 502-1 |
| | 322B-2 | down | DEVICE | 502-2 |
| | 322B-3 | down | DEVICE | 502-3 |
| | 322B-4 | down | DEVICE | 502-4 |
| | 322B-5 | down | DEVICE | 502-5 |
| | 322B-6 | down | – | – |

Column labels: 601, 602, 603, 604, 605

FIG. 10

SWITCH VS TABLE 610

| SWITCH | VS# | VALID | START VB# | NUMBER OF ENTRY |
|---|---|---|---|---|
| 301 | 1 | Yes | 1 | 4 |
| | 2 | Yes | 8 | 3 |
| | 3 | Yes | 15 | 2 |
| 302 | 4 | Yes | 22 | 3 |
| | 5 | Yes | 29 | 3 |
| | 6 | Yes | 36 | 2 |

Column labels: 611, 612, 613, 614, 615

FIG. 11

SWITCH VS BRIDGE TABLE 620

| SWITCH | VS# | VALID | DIRECTION | MAP | PORT# | VH# |
|---|---|---|---|---|---|---|
| 301 | 1 | Yes | up | Yes | 321A-1 | 0 |
| | 2 | Yes | down | Yes | 321B-1 | 0 |
| | 3 | Yes | down | Yes | 321B-2 | 0 |
| | 4 | Yes | down | Yes | 321B-3 | 0 |
| | 5 | Yes | down | No | – | – |
| | 6 | Yes | down | No | – | – |
| | 7 | Yes | down | No | – | – |
| | 8 | Yes | up | Yes | 321A-2 | 0 |
| | 9 | Yes | down | No | – | – |
| | 10 | Yes | down | No | – | – |
| | 11 | Yes | down | No | – | – |
| | 12 | Yes | down | Yes | 321B-4 | 0 |
| | 13 | Yes | down | Yes | 321B-5 | 0 |
| | 14 | Yes | down | No | – | – |
| | 15 | Yes | up | Yes | 321A-3 | 0 |
| | 16 | Yes | down | No | – | – |
| | 17 | Yes | down | No | – | – |
| | 18 | Yes | down | No | – | – |
| | 19 | Yes | down | No | – | – |
| | 20 | Yes | down | No | – | – |
| | 21 | Yes | down | Yes | 321B-6 | 0 |
| 302 | 22 | Yes | up | Yes | 322A-1 | 0 |
| | 23 | Yes | down | Yes | 322B-1 | 0 |
| | 24 | Yes | down | Yes | 322B-2 | 0 |
| | 25 | Yes | down | No | – | – |
| | 26 | Yes | down | No | – | – |
| | 27 | Yes | down | No | – | – |
| | 28 | Yes | down | No | – | – |
| | 29 | Yes | up | Yes | 322A-2 | 0 |
| | 30 | Yes | down | No | – | – |
| | 31 | Yes | down | No | – | – |
| | 32 | Yes | down | Yes | 322B-3 | 0 |
| | 33 | Yes | down | Yes | 322B-4 | 0 |
| | 34 | Yes | down | No | – | – |
| | 35 | Yes | down | No | – | – |
| | 36 | Yes | up | Yes | 322A-3 | 0 |
| | 37 | Yes | down | No | – | – |
| | 38 | Yes | down | No | – | – |
| | 39 | Yes | down | No | – | – |
| | 40 | Yes | down | No | – | – |
| | 41 | Yes | down | Yes | 322B-5 | 0 |
| | 42 | Yes | down | No | – | – |

Columns: 621, 622, 623, 624, 625, 626, 627

FIG. 15

SWITCH VS TABLE 610

| SWITCH | VS# | VALID | START VB# | NUMBER OF ENTRY |
|---|---|---|---|---|
| 301 | 1 | Yes | 1 | 2 |
|  | 2 | Yes | 8 | 4 |
|  | 3 | Yes | 15 | 2 |
| 302 | 4 | Yes | 22 | 3 |
|  | 5 | Yes | 29 | 3 |
|  | 6 | Yes | 36 | 2 |

FIG. 16

SWITCH VS BRIDGE TABLE 620

| SWITCH | VS# | VALID | DIRECTION | MAP | PORT# | VH# |
|---|---|---|---|---|---|---|
| 301 | 1 | Yes | up | Yes | 321A-1 | 0 |
|  | 2 | Yes | down | Yes | 321B-1 | 0 |
|  | 3 | Yes | down | No | – | – |
|  | 4 | Yes | down | No | – | – |
|  | 5 | Yes | down | No | – | – |
|  | 6 | Yes | down | No | – | – |
|  | 7 | Yes | down | No | – | – |
|  | 8 | Yes | up | Yes | 321A-2 | 0 |
|  | 9 | Yes | down | No | – | – |
|  | 10 | Yes | down | No | – | – |
|  | 11 | Yes | down | Yes | 321B-3 | 0 |
|  | 12 | Yes | down | Yes | 321B-4 | 0 |
|  | 13 | Yes | down | Yes | 321B-5 | 0 |
|  | 14 | Yes | down | No | – | – |
|  | 15 | Yes | up | Yes | 321A-3 | 0 |
|  | 16 | Yes | down | No | – | – |
|  | 17 | Yes | down | No | – | – |
|  | 18 | Yes | down | No | – | – |
|  | 19 | Yes | down | No | – | – |
|  | 20 | Yes | down | No | – | – |
|  | 21 | Yes | down | Yes | 321B-6 | 0 |
| 302 | 22 | Yes | up | Yes | 322A-1 | 0 |
|  | 23 | Yes | down | Yes | 322B-1 | 0 |
|  | 24 | Yes | down | Yes | 322B-2 | 0 |
|  | 25 | Yes | down | No | – | – |
|  | 26 | Yes | down | No | – | – |
|  | 27 | Yes | down | No | – | – |
|  | 28 | Yes | down | No | – | – |
|  | 29 | Yes | up | Yes | 322A-2 | 0 |
|  | 30 | Yes | down | No | – | – |
|  | 31 | Yes | down | No | – | – |
|  | 32 | Yes | down | Yes | 322B-3 | 0 |
|  | 33 | Yes | down | Yes | 322B-4 | 0 |
|  | 34 | Yes | down | No | – | – |
|  | 35 | Yes | down | No | – | – |
|  | 36 | Yes | up | Yes | 322A-3 | 0 |
|  | 37 | Yes | down | No | – | – |
|  | 38 | Yes | down | No | – | – |
|  | 39 | Yes | down | No | – | – |
|  | 40 | Yes | down | No | – | – |
|  | 41 | Yes | down | Yes | 322B-5 | 0 |
|  | 42 | Yes | down | No | – | – |

COMPUTER SYSTEM AND BUS ASSIGNMENT METHOD

CLAIM OF PRIORITY

This application is a continuation of U.S. patent application Ser. No. 12/486,927, filed Jun. 18, 2009, now allowed, which claims priority from Japanese application JP 2008-201983 filed on Aug. 5, 2008, the contents of which are hereby incorporated by reference into this application.

TECHNICAL FIELD

The present invention relates to a computer system that unifies plural servers and a bus assignment method in the computer system, and more specifically, to bus assignment to make accesses to IO devices operate normally in moving a logical server between physical servers.

BACKGROUND ART

Along with performance improvement of the computer systems, a technique of curtailing a cost by consolidating processing that is distributed to plural servers into a single server has been put in practical use. As a technique of consolidating the servers, a server partitioning is known. This is to make plural operating systems work on a single server by assigning one operating technique of consolidating the servers, a server partitioning is known. This is to make plural operating systems work on a single server by assigning one operating system to each of divided partitions.

The server partitioning is divided into two: a physical partitioning of assigning an operating system to a physical computer resource of a node unit that includes a processor and a memory; and a logical partitioning of virtualizing a physical processor and a memory to generate an arbitrary number of logical partitions (logic processors) in a computer by firmware, called a hypervisor.

Since with the physical partitioning, the operating system can exclusively use physical computer resources, it can attain high performance. However, in order to increase the physical partitions, it is necessary to also multiply physical computer resources, and therefore there is a physical limit to the number of the physical partitions.

In the logical partitioning system, each operating system (guest OS) is made to execute on the logic processor that the hypervisor provides. Moreover, by the hypervisor mapping plural logical partitions on the physical processor, a partition can be divided into units finer than the node. This enables plural logical partitions to be executed by a single physical processor while the processor is changed over in timesharing, and it is possible to generate more of logical partitions than the number of the physical processors and to make them execute simultaneously.

As a method of further making effective use of the physical computer resource in the computer system that combine these physical partitioning and logical partitioning, there are known a method whereby logical partitions share an IO slot by switching over the IO slot that is used among the logical partitions in time sharing without causing degradation of performance (JP-A No. 122640/2005), a method whereby a logical partition that is located on a certain physical partition is migrated to a different physical partition according to a user's policy (JP-A No. 244481/2006), and a method whereby plural servers share plural computer resources through a switch (Multi-Root I/O Virtualization and Sharing Specification Revision 1.0, 1.2.3. MR-IOV Topology pp. 21-23 (May 12, 2008)).

Moreover, as the logical partitioning using the hypervisor, there are a method using only virtualization software and a method using hardware for some processing. The method using the virtualization software has high flexibility over IO virtualization because the virtualization software performs conversion from logical IO resource IDs (indicating a PCI bus number, an MMIO address, an IO address, and a configuration address that are necessary to access the IO device) to physical IO resource IDs. But its performance decreases because of overhead by software processing.

On the other hand, since the method using the hardware can transparently accesses the IO device by converting the logical IO resource ID to the physical IO resource ID required at the time of an IO access, the method has higher performance than the method using only the virtualization software, but its flexibility over the IO virtualization lowers.

As described above, since, in the virtualization method using the hardware, the IO device is provided transparently to the guest OS, its performance is high compared with the method using the virtualization software, but its flexibility over the IO virtualization lowers. This is because, when migration of the logical partition described in JP-A No. 244481/2006, etc. is performed, disagreement is caused between the logical IO resource ID of the IO device that the guest OS uses and the physical IO resource ID.

For example, in the computer system using the virtualization method by the hardware, when Hot Plugging is done, the reallocation of the IO resource ID of the each IO device is performed by hot-plugging a new IO device, and the IO resource ID of the IO device already in use may change. In this case, the guest OS may use the IO resource ID before alteration with an intention of accessing the IO device that was used originally, and may access the different IO device. In the worst case, the computer system may become unable to be activated at the time of reboot because the IO resource ID of a boot device has changed.

Moreover, when live migration of the logical partitions is performed in a similar computer system, an IO configuration of the computer system when seen from the guest OS may be different before and after the migration. In this case, contention arises between the IO resource ID that the guest OS used before the migration and the IO resource ID of another device currently used at the migration destination.

SUMMARY OF THE INVENTION

The object of the present invention is to realize takeover of an IO configuration without causing disagreement between a logical IO resource ID of an IO device that a guest OS uses in a virtual computer system and a physical IO resource ID, and to make an IO access at the time of migrating a logical partition work normally.

In order to solve the above-mentioned problem, the computer system according to the present invention includes: a server having an IO bridge; a switch that has a first IO bridge for connecting with the IO bridge of the server through a bus and plural second IO bridges for connecting with plural IO devices through a bus; and bus number assignment management means for assigning mutually different PCI bus numbers to the plural second IO bridges.

Moreover, the IO resource ID assignment method according to the present invention is an IO resource ID assignment method in the computer system that includes the server having the IO bridge and the switch that has the first IO bridge for connecting with the IO bridge of the server through the bus and the plural second IO bridges for connecting to the plural IO devices through the bus, and includes: a bus number assignment management step of, when assigning a PCI bus number as the IO resource ID, fixedly assigning the PCI bus number to the second IO bridges; and a step of referring to a relationship between the PCI bus numbers assigned in the bus number assignment management step and the second IO bridge and forming a virtual switch for connecting the server and the IO device together.

In a preferred example, the bus number assignment management means is configured as a bus number assignment management table for registering information for fixedly assigning the PCI bus number to the IO bridge in the switch.

Preferably, the bus number assignment management table registers pieces of information about an upstream PCI bus number and a downstream PCI bus number that are assigned to a virtual bridge in the switch for every switch number for identifying the switch, and a downstream-most PCI bus number that is connected from the IO bridge.

In a preferred example, the computer system has a PCI manager for setting up contents of the bus number assignment management table and a register that is prepared in the switch and stores the bus number assignment management table.

Especially, the computer system according to the present invention, in addition to the above-mentioned configuration, has plural physical servers, and when the logical partitions of a certain physical server are live migrated to another physical server, the computer system does not update the bus number assignment management table but updates the switch VS(Virtual Switch) bridge table, and the logical partition that is migrated to the other physical server takes over the PCI bus number used before migration and uses the IO device.

According to the present invention, with the above configuration, improvement of performance and reliability by transparent accesses to the IO devices and flexibility by live migration can be realized.

BRIEF DESCRIPTION OF THE DRAWINGS

FIG. 4 is a diagram showing one example of a switch VS(Virtual Switch) table 610;

FIG. 5 is a diagram showing one example of a switch VS(Virtual Switch) bridge table 620;

FIG. 6 is a diagram showing one example of a bus number assignment management table 630;

FIG. 7 is a diagram showing one example in which PCI bus numbers are fixedly assigned;

FIG. 9 is a diagram showing one example of the switch port table 600;

FIG. 10 is a diagram showing one example of the switch VS table 610;

FIG. 11 is a diagram showing one example of the switch VS bridge table 620;

FIG. 15 is a diagram showing one example of the switch VS table 610 (Second embodiment);

FIG. 16 is a diagram showing one example of the switch VS bridge table 620 (Second embodiment);

DESCRIPTION OF THE PREFERRED EMBODIMENTS

Hereafter, embodiments will be described with reference to the drawings.

First Embodiment

Figure 1:
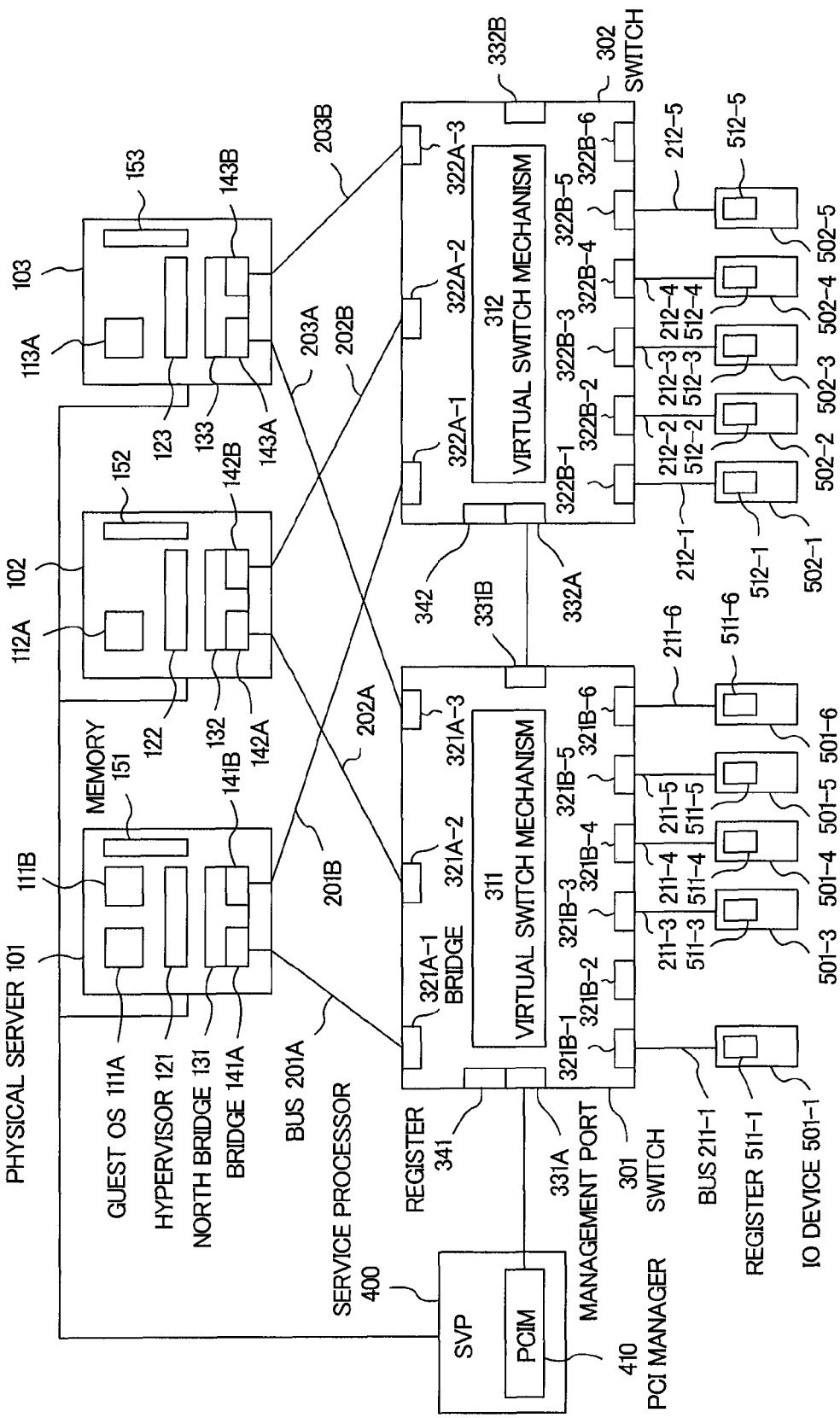
FIG. 1 is a diagram showing a configuration example of a computer system according to one embodiment.

FIG. 1 shows a computer system configuration according to one embodiment.

This computer system is constructed with plural physical servers 101 to 103 and plural IO devices 501-1, 501-3 to 501-6, and 502-1 to 502-5 connected to plural switches 301, 302. Furthermore, a service processor (SVP) 400 is connected to the physical servers 101 to 103 and the switches 301, 302 so as to be able to communicate with them. A PCI manager 410 for managing a setup, alteration, etc. of virtual switch mechanisms 311, 312 is mounted on the SVP 400, and is connected to the switches 301, 302 so as to be able to communicate with them.

Incidentally, although the switch is in a single stage configuration in this example, it is also possible for the switch to be constructed in a multistage configuration. Moreover, the PCI manager 410 does not necessarily need to be inside the SVP 400, but can be disposed outside the SVP 400, being connected to the SVP 400 so as to be able to communicate with it.

Regarding the plural physical servers, the physical server 101 is partitioned into plural logical partitions (in this example, two) by a hypervisor 121, which have respective guest OSs 111A, 111B. A north bridge 131 includes plural IO bridges 141A, 141B, and is connected to the switches 301, 302 by buses 201A, 201B. Moreover, physical servers 102, 103 similarly include: each of them is configured to have one guest OS 112A (113A) and a north bridge 132 (133) that is connected to the switch 301 (302) through plural bridges 142A, 142B (143A, 143B).

The switch 301 has: plural first IO bridges 321A-1 to 321A-3 connected to the physical servers 101 to 103 through the bus 201A etc.; second IO bridges 321B-1 to 321B-6 connected to the IO devices 501 through a bus 211; a management port 331A connected to the PCI manager 410 of the SVP 400; a control port 331B connected to a control port 332A of the switch 302; a register 341; and the virtual switch mechanism 311.

In addition, in the computer system, the plural IO devices 501-1 to 501-6 are connected to the second IO bridges 321B-1 to 321B-6 through a slot (not illustrated) of the switch 301. The second IO bridges 321B-1 to 321B-6 in correspond to the so-called slot positions.

The virtual switch mechanism 311 is set up or altered by the PCI manager 410 through the management port 331A to form a virtual switch. The register 341 stores a switch port table 600 (to be described later).

The switch 302 is not directly connected to the SVP 400, but is connected to the switch 301 through the control port 332A. Except for this, the switch 302 has fundamentally the same configuration as that of the switch 301. The switches 301, 302 may differ in the number of and a type of the IO devices connected to them.

Figure 2:
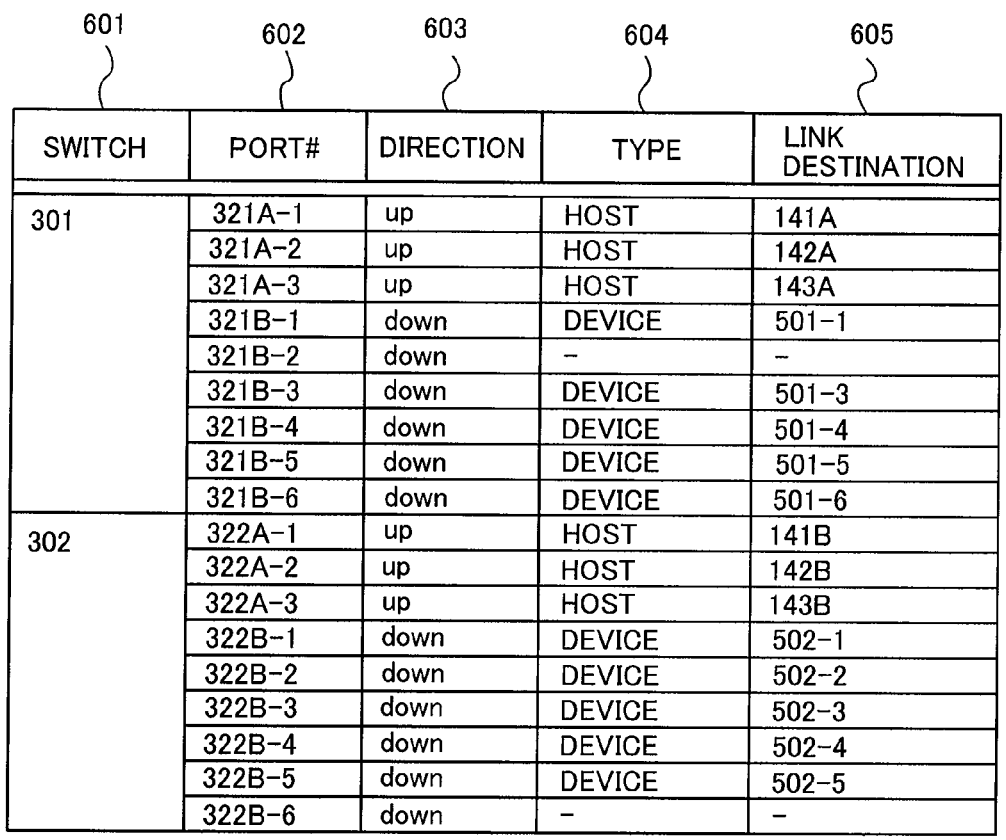
FIG. 2 is a diagram showing one example of a switch port table 600 in a switch.

FIG. 2 shows a configuration example of the switch port table. The switch port table 600 is a table for controlling ports of the switch and is stored over the registers 341, 342 of the respective switches 301, 302. The switch port table 600 registers pieces of information of: a port number 602 in a switch 601; a direction 603 in which the first IO bridge and the second IO bridge of the port number are connected; a type 604 of a connection destination; and a link destination 605. Contents of this control table are set up by the PCI manager 410.

For example, it is indicated that the port number of the switch 302: a bridge 322A-1 has its connection in an UP direction (upstream direction), the type of the connection destination is the physical server 101 as the host, and a link destination is the bridge 141B of the physical server 101.

Next, the virtual switch formed with the virtual switch mechanism 311 etc. will be explained with reference to FIG. 3.

In the illustrated example, three virtual switches are formed by each of the virtual switch mechanisms 311, 312. Virtual switches 351-1, 351-2, and 351-3 are formed in the switch 301; virtual switches 352-1, 352-2, and 352-3 are formed in the switch 302.

For example, the virtual switches 351-1 is constructed with the bridge 321A-1 to which the host is connected and the bridges 321B-1, 321B-3 to which the IO devices 501-1, 501-3 are connected, respectively. The bridge 321B-2 is not used.

The PCI manager 410 is made to execute by an administrator manipulating the SVP 400, and this virtual switch is formed by the PCI manager 410 setting up the contents of a switch VS table 610 (FIG. 4) and a switch VS bridge table 620 (FIG. 5).

FIG. 4 shows a configuration example of the switch VS table 610. The switch VS table 610 is a table for controlling the virtual switch in the switch, and is stored over the registers 341, 342 in the respective switches.

This switch VS table 610 registers pieces of information of: a switch number 611 for identifying a target switch; a virtual switch number 612 for indicating a number of the virtual switch formed in the switch 611; a valid field 613 for indicating whether the virtual switch concerned is valid; a start number 614 of the virtual bridge that forms the virtual switch when the virtual switch concerned is valid (Yes); and an entry number 615 for indicating the number of entries of the virtual bridge.

For example, three virtual switches (VS#1 to #3) are set up in the switch 301, all being valid (Yes), and virtual bridge start numbers of the virtual switches VS#1 to #3 are VB#1, #8, and #15. The numbers of respective entries of the virtual switches VS#1 to #3 are 3, 3, and 2.

FIG. 5 shows a configuration example of the switch VS bridge table 620. The switch VS bridge table 620 is a table for controlling the virtual bridges that form the virtual switches, and is stored over the registers 341, 342 in the respective switches.

This switch VS bridge table 620 registers pieces of information of: a switch number 621 for identifying the target switch; a valid field 623 for indicating whether a virtual bridge of a virtual bridge number 622 in the switch concerned is valid; a direction 624 for, when the virtual bridge is valid (Yes), indicating its direction; a map field 625 for indicating whether it is mapped to the IO bridge of a port number 626; the port number 626 for identifying the port; and a virtual hierarchy number 627 for, when it is mapped, indicating a number of its virtual hierarchy.

For example, the switch 301 is given the virtual bridge numbers of the VB#1 to #21, total 21, and all the bridges are in a valid (Yes) state. The 21 virtual bridges are divided into three groups each having seven virtual bridges, correspondingly to the three virtual switches (VS#1 to #3). A start virtual bridge corresponding to the virtual switch VS#1 is assigned as "VB#1"; a start virtual bridge corresponding to the virtual switch VS#2 is assigned as "VB#8"; a start virtual bridge corresponding to the virtual switch VS#3 is assigned as "VB#15"; and so on. For example, in the virtual switch VS#1, VB#1 is mapped, in the UP direction, to a port #321A-1, VB#2 is mapped, in a DOWN direction, to a port #321B-1, and VB#4 is mapped, in the DOWN direction, to a port #321B-3. Other maps indicate "Nos."

Therefore, in the virtual switch VS#1, valid entries are three. Similarly, it is understood that a virtual switch VS#2 has three valid entries, VB#8, VB#12, and VB#13, and the virtual switch VS#3 has two valid entries, the VB#15 and the VB#21.

FIG. 6 shows a structure example of a bus number assignment management table 630. The bus number assignment management table 630 registers information required to fixedly assign an IO resource ID, and the information is stored over the registers 341, 342 in the respective switches 301, 302. Contents of the bus number assignment management table 630 are set up by the PCI manager 410 of the SVP 400. For example, this bus number assignment management table 630 is realized by a method of directly transferring information to an EFI/BIOS that practically assigns the IO resource IDs through the registers 341, 342 in the switches 301, 302.

The bus number assignment management table 630 registers pieces of information of a primary bus number 633, a secondary bus number 634 and a subordinate bus number 635 that are assigned to the virtual bridge of a virtual bridge number 632 in the switch concerned, for every switch number 631 for identifying the switch.

FIG. 7 shows an example in which the PCI bus number is fixedly assigned based on the bus number assignment management table 630. An IO bridge 641 shows an IO bridge that constitutes a north bridge, and Bus #642 shows the PCI bus number of a bus between the IO bridge 641 and an IO bridge 643. The IO bridge 643 shows a first virtual bridge in the switch, and VB#644 shows a virtual bridge number that the IO bridge 643 can take. Bus #645 shows the PCI bus number of a bus between the IO bridge 643 and an IO bridge 646, and the IO bridge 646 shows a second IO bridge in the switch, and VB#647 shows a virtual bridge number that the IO bridge 646 can take. Bus #648 shows the PCI bus number of a bus between the IO bridge #646 and an IO device 649, and the IO device 649 shows an IO device connected to the switch.

FIG. 7 shows the PCI bus numbers of a bus for connecting the IO bridge and the IO bridge and of a bus for connecting the IO bridge and the IO device, showing that the PCI bus numbers are fixedly assigned to the respective buses without multiplicity.

Next, as an operation of a first embodiment, a Hot Plug operation of the IO device will be described. It is assumed that the computer system takes an initial configuration shown in FIG. 1, and as control tables in the initial configuration, ones that are shown in FIG. 2, FIG. 4, and FIG. 5 are used. The virtual switch 351-1 of FIG. 3 corresponds to No. 1 of the virtual switch number 612 of FIG. 4 and includes No. 1, No.

2, and No. 4 virtual bridges of the virtual bridge number 622 of FIG. 5. Therefore, the virtual bridges are assigned to the first IO bridges 321A-1, 321B-1, and 321B-3 in the switch 301 of FIG. 3, and the guest OSs 111A, 111B can transparently use the IO devices 501-1, 501-3. In addition, the virtual switch 352-1 in the switch 302 is also formed based on FIG. 4 and FIG. 5, and virtual switches are similarly formed for the respective physical servers 102, 103 of FIG. 3.

First, problems of a Hot Plug operation when the present invention is not applied will be explained. In an initial configuration of the computer system of this embodiment, the EFI/BIOS assigns in sequence the IO resource IDs to the first IO bridges 321A-1, 321B-1, and 321B-3 that are connected from the IO bridge 141A in the north bridge 131 of FIG. 3. Therefore, when taking as an example assignment of the PCI bus number from the physical server 101, the bus 201A is assigned as a PCI bus number No. 1, the virtual switch 351-1 is assigned as a PCI bus number No. 2, a bus 211-1 is assigned as a PCI bus number No. 3, and a bus 211-3 is assigned as a PCI bus number No. 4.

Figure 8:
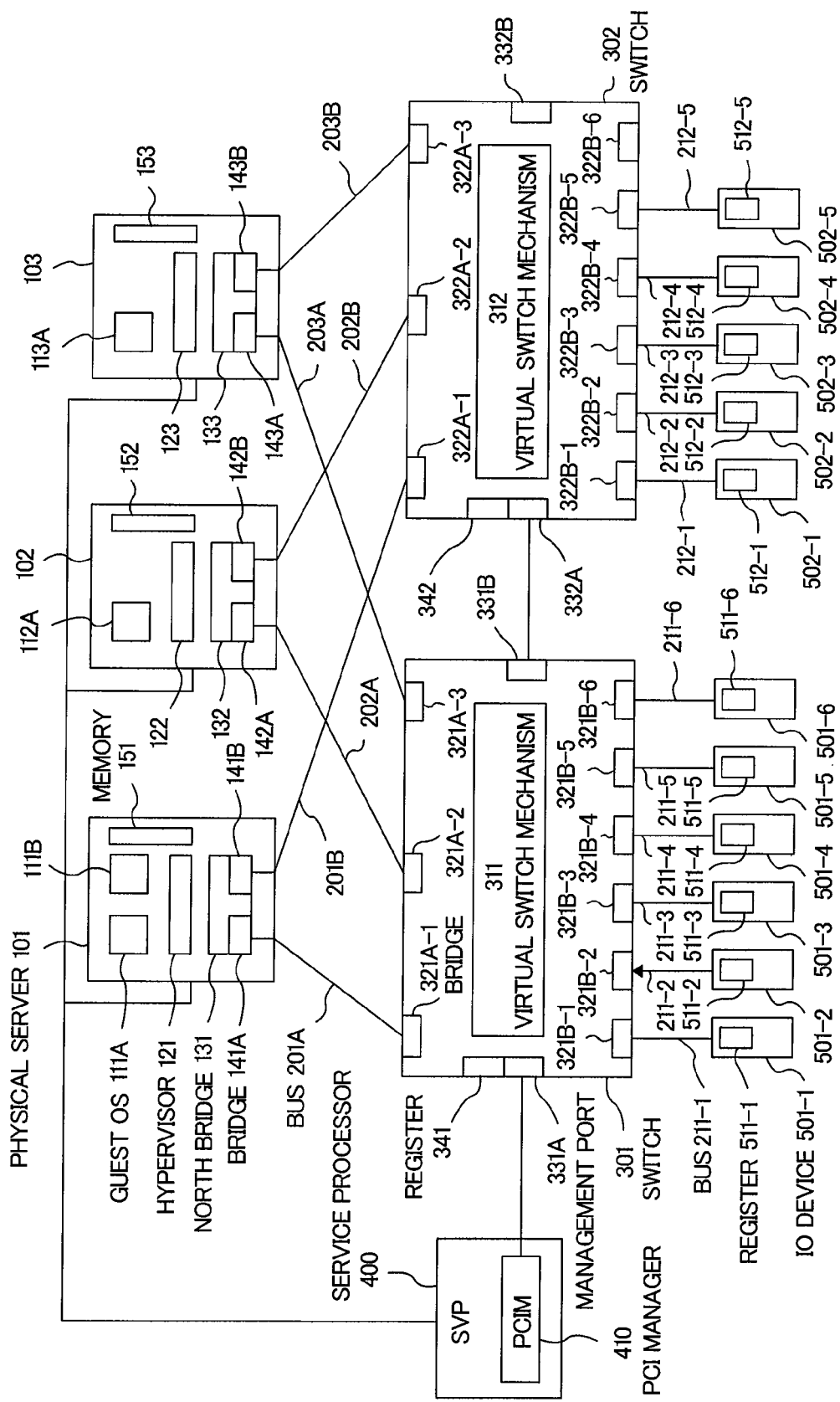
FIG. 8 is a diagram showing a configuration example of the computer system.

In this state, an IO device 501-2 is Hot Plugged in the computer system, as shown in FIG. 8. Here, the IO device 501-2 shall be added to the IO bridge 141A of the north bridge 131 in the physical server 101.

By this Hot Plugging, the switch port table 600, the switch VS table 610, and the switch VS bridge table 620 are updated, as in FIG. 9 to FIG. 11. That is, the device 501-2 of a link destination is connected to a port #321B-2 of the switch port table 600 in the DOWN direction. In addition, the switch VS table 610 has the number of entries 4 of the VS#1, increased by one. The DOWN direction of the VB#3 becomes valid in the switch VS bridge table 620, to which the port #321B-2 is added.

Figure 12:
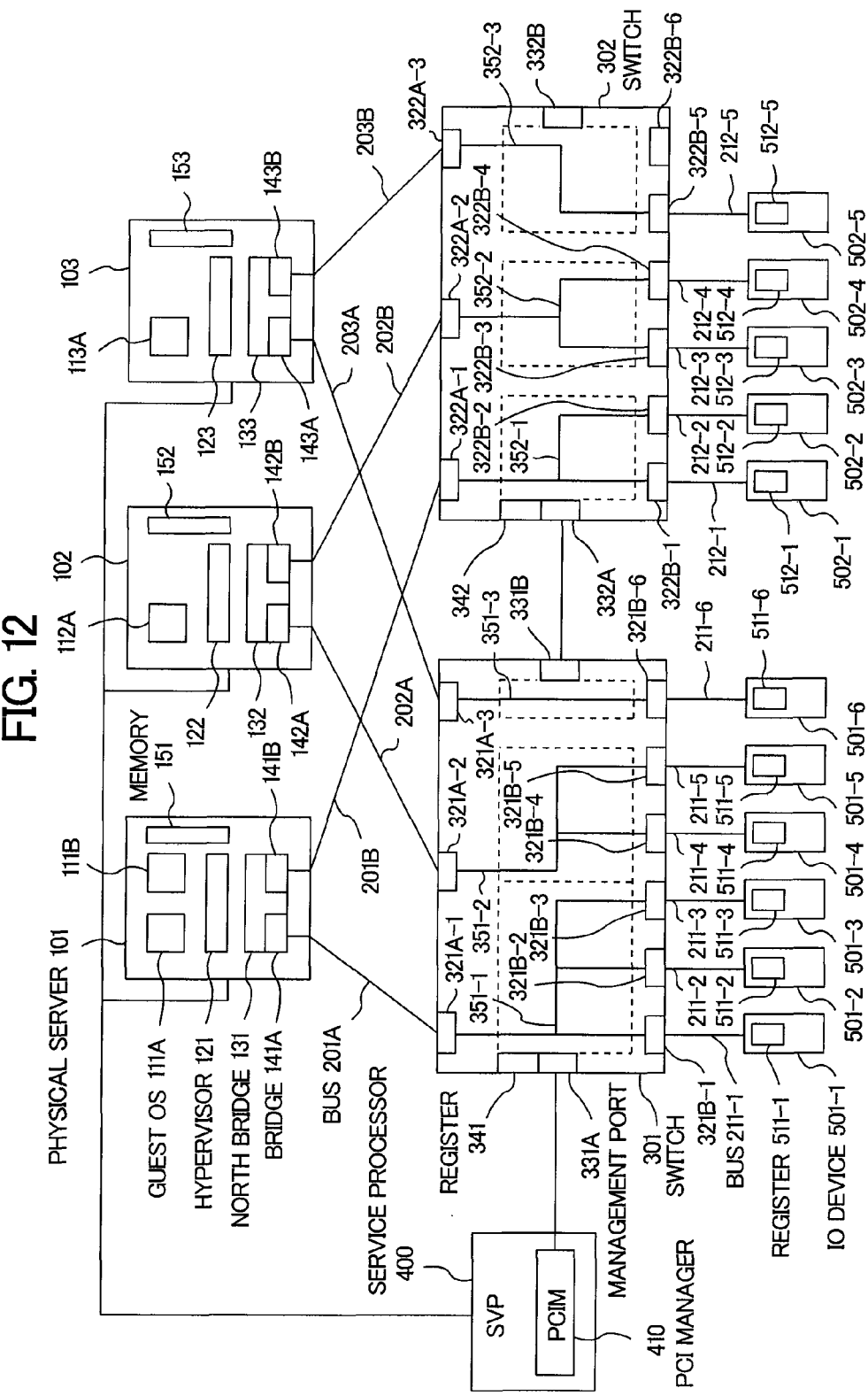
FIG. 12 is a diagram showing a configuration example of the virtual switch in the computer system.

As a result, the virtual switch is configured to be added to the virtual switch 351-1, as shown in FIG. 12.

In the virtual switch of FIG. 12, by the new IO device 501-2 being Hot Plugged, reallocation of the IO resource ID is performed: the bus 201A is assigned as the PCI bus number No. 1, the virtual switch 351-1 is assigned as the PCI bus number No. 2, the bus 211-1 is assigned as the PCI bus number No. 3, a bus 211-2 is assigned as the PCI bus number No. 4, and the bus number 211-3 is assigned as the PCI bus number No. 5 in sequence. At this time, since the bus 211-2 that is connected to the IO device 501-2 being Hot Plugged is newly assigned as the PCI bus number No. 4, the bus 211-3 that was the PCI bus number No. 4 will be newly assigned as the PCI bus number No. 5.

Therefore, in the case where the guest OSs 111A, 111B in the physical server 101 use the IO resource ID before the Hot Plugging in order to access an IO device 501-3, they will access the IO device 501-2. Depending on use of the IO device, the computer system can continue working by support of the OS even when the access becomes impossible. However, if a boot device cannot be accessed at the time of reboot, the computer system can no longer be activated, which incurs a fatal problem.

Now, a Hot Plug operation in the case where the present invention is applied will be explained.

Figure 3:
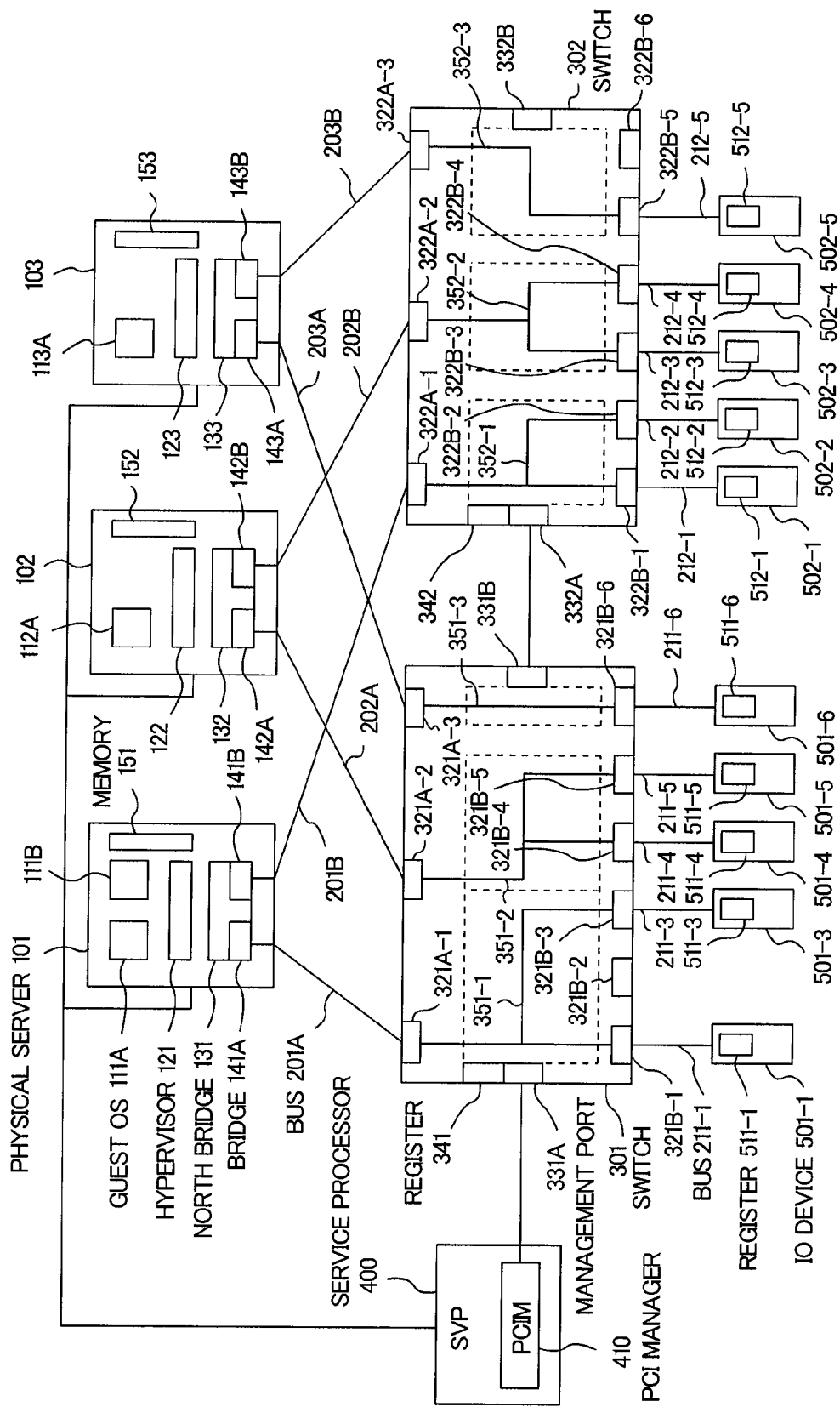
FIG. 3 is a diagram showing one example of a virtual switch in the computer system.

First, in this embodiment, before the EFI/BIOS assigns the IO resource IDs, the PCI manager 410 of FIG. 3 sets up the bus number assignment management table 630 shown in FIG. 6. The PCI manager 410 of FIG. 3 uniquely establishes the configuration of the switch/IO bridge from the computer system configuration, and sets up the primary bus number 633, the secondary bus number 634 and the subordinate bus number 635 of FIG. 6 that are necessary information to fix the IO resource ID to be assigned to respective IO bridges/virtual bridges, in the register 341 in the switch 301 of FIG. 3, as the bus number assignment management table.

The information of the bus number assignment management table 630 being set-up of FIG. 6 is reflected on the EFI/BIOS side through the register 341 in the switch 301 of FIG. 3, and the EFI/BIOS assigns the fixed IO resource IDs to the respective IO bridges/virtual bridges based on the information. Therefore, when assignment of the PCI bus number from the physical server 101 is taken for an example, the bus 201A is assigned as the PCI bus number No. 1, the virtual switch 351-1 is assigned as the PCI bus number No. 2, the bus 211-1 is assigned as the PCI bus number No. 3, and the bus 211-3 is assigned as the PCI bus number No. 5. Incidentally, although the IO resource IDs that should be assigned were decided to the second IO bridge 321B-2 having no IO device and the second IO bridges 321B-4 to 321B-6 for which no IO device is used, since actually they are not used and the virtual switch 351-1 is not formed, the IO resource IDs are not assigned.

Next, the IO device 501-2 is Hot Plugged as shown in the computer system configuration of FIG. 8. Incidentally, the IO device 501-2 shall be added to the IO bridge 141A of the north bridge 131 in the physical server 101. The switch port table 600 shown in FIG. 9, the switch VS table 610 shown in FIG. 10, and the switch VS bridge table 620 shown in FIG. 11 are updated, and the IO device 501-2 is added to the virtual switch 351-1, as shown in FIG. 12.

With the new IO device 501-2 of FIG. 12 Hot Plugged, the reallocation of the IO resource ID is performed: the bus 201A is assigned as the PCI bus number No. 1, the virtual switch 351-1 is assigned as the PCI bus number No. 2, the bus 211-1 is assigned as the PCI bus number No. 3, the bus 211-2 is assigned as the PCI bus number No. 4, and the bus 211-3 is assigned as the PCI bus number No. 5. In this case, since the IO resource ID that should be assigned to the second IO bridge 321B-2 was established in advance, the previously secured PCI bus number No. 4 is assigned to the bus 211-2 connected to the Hot Plugged IO device 501-2.

Since the assigned IO resource ID was uniquely established so as not to overlap those of other IO bridges/virtual bridges, the IO resource IDs of the second IO bridges 321B-1, 321B-3 to which the IO devices 501-1, 501-3 used before the Hot Plugging are connected do not change and accesses to the IO devices 501-1, 501-3 do not become impossible.

In this way, according to this embodiment, by fixedly assigning the IO resource IDs, even when Hot Plugging of the IO device is performed during system operation, it does not affect accesses to other IO devices, and consequently it is possible to flexibly configure the computer system.

Second Embodiment

A second embodiment relates to assignment of a bus to the IO device accompanying with live migration of the logical partitions. The computer system in the second embodiment, like the first embodiment, is of the same initial configuration as is shown in FIG. 1.

First, a problem on the live migration of the logical partitions when the present invention is not applied will be explained.

In the initial configuration of the computer system of this embodiment, the EFI/BIOS assigns the IO resource IDs in sequence to the first IO bridges 321A-1, 321B-1, and 321B-3 that are connected from the IO bridge 141A in the north bridge 131 of FIG. 3 and the first IO bridges 321A-2, 321B-4, and 321B-5 that are connected from the IO bridge 142A in the north bridge 132. Therefore, for example, when assigning the PCI bus number from the physical server 101, the bus 201A is assigned as the PCI bus number No. 1, the virtual switch 351-1 is assigned as the PCI bus number No. 2, the bus 211-1 is assigned as the PCI bus number No. 3, and the bus 211-3 is assigned as the PCI bus number No. 4.

Figure 13:
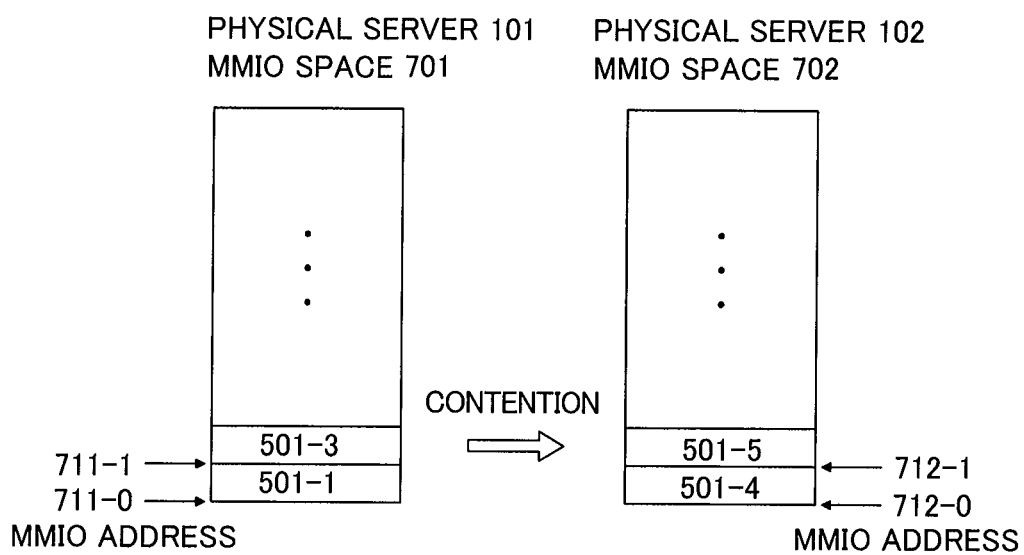
FIG. 13 is a diagram showing an example of assignment of MMIO space according to one embodiment.

Similarly, when assigning MMIO space in sequence to the IO devices, an MMIO address 711-0 is assigned for an IO device 501-1 in an MMIO space 701 of the physical server 101 of FIG. 13 and an MMIO address 711-1 is assigned for the IO device 501-3. At this time, the MMIO space are mapped in three memories 151 to 153 in the physical server 101 to 103, and a fixed space is assigned for every IO device, as shown in FIG. 13. Moreover, in order to enable the IO device to know which range is a space assigned to itself, the MMIO address is stored over registers 511, 512 in the IO device.

Further, when assigning the PCI bus number from the physical server 102, a bus 202A is assigned as the PCI bus number No. 1, a virtual switch 351-2 as the PCI bus number No. 2, a bus 211-4 as the PCI bus number No. 3, and a bus 211-5 as the PCI bus number No. 4. Similarly, when assigning the MMIO space in sequence to the IO devices, in an MMIO space 702 of the physical server 102 of FIG. 13, an MMIO address 712-0 is assigned to an IO device 501-4, and an MMIO address 712-1 is assigned to an IO device 501-5.

Figure 14:
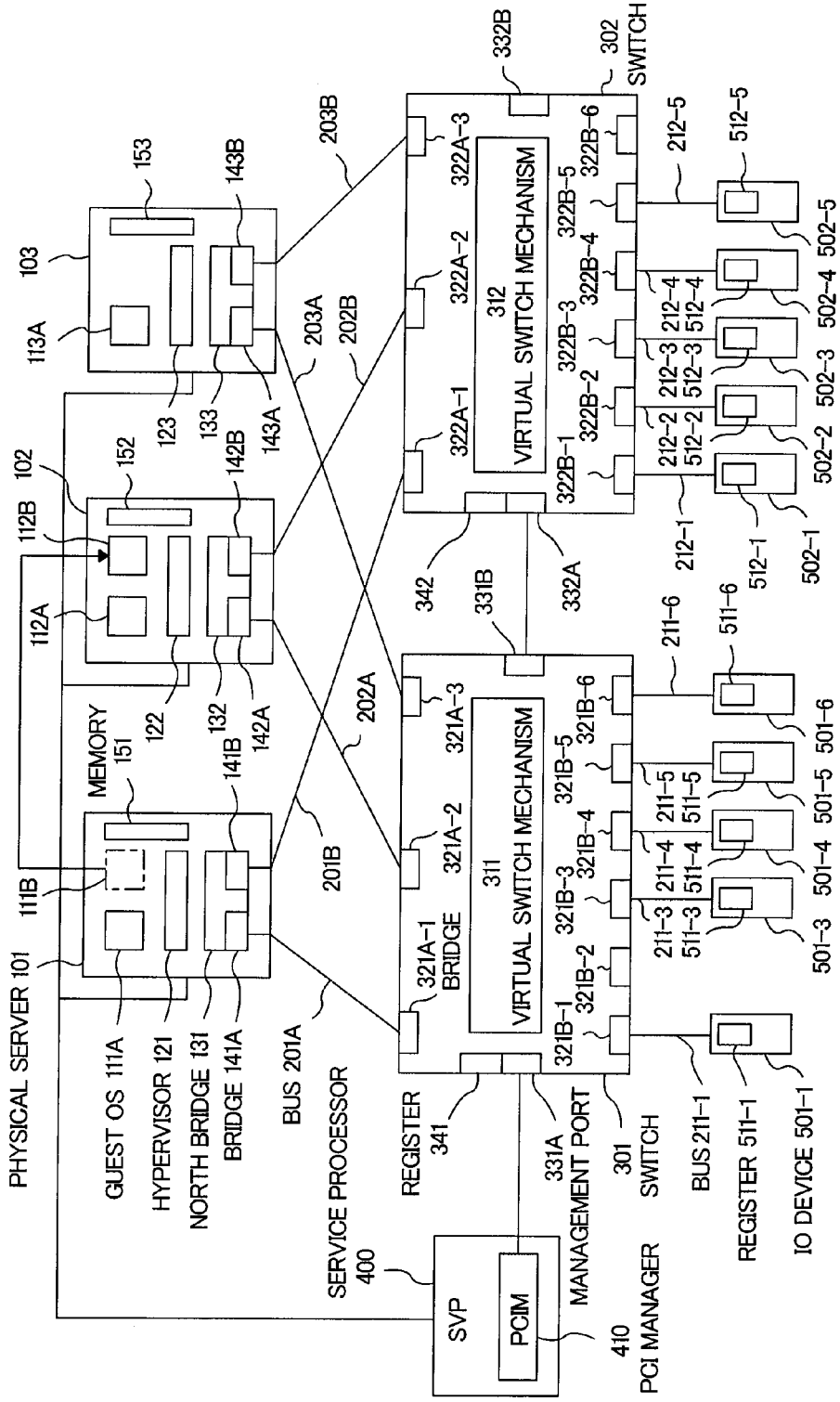
FIG. 14 is a diagram showing a configuration example of a computer system according to one embodiment (Second embodiment)
Figure 17:
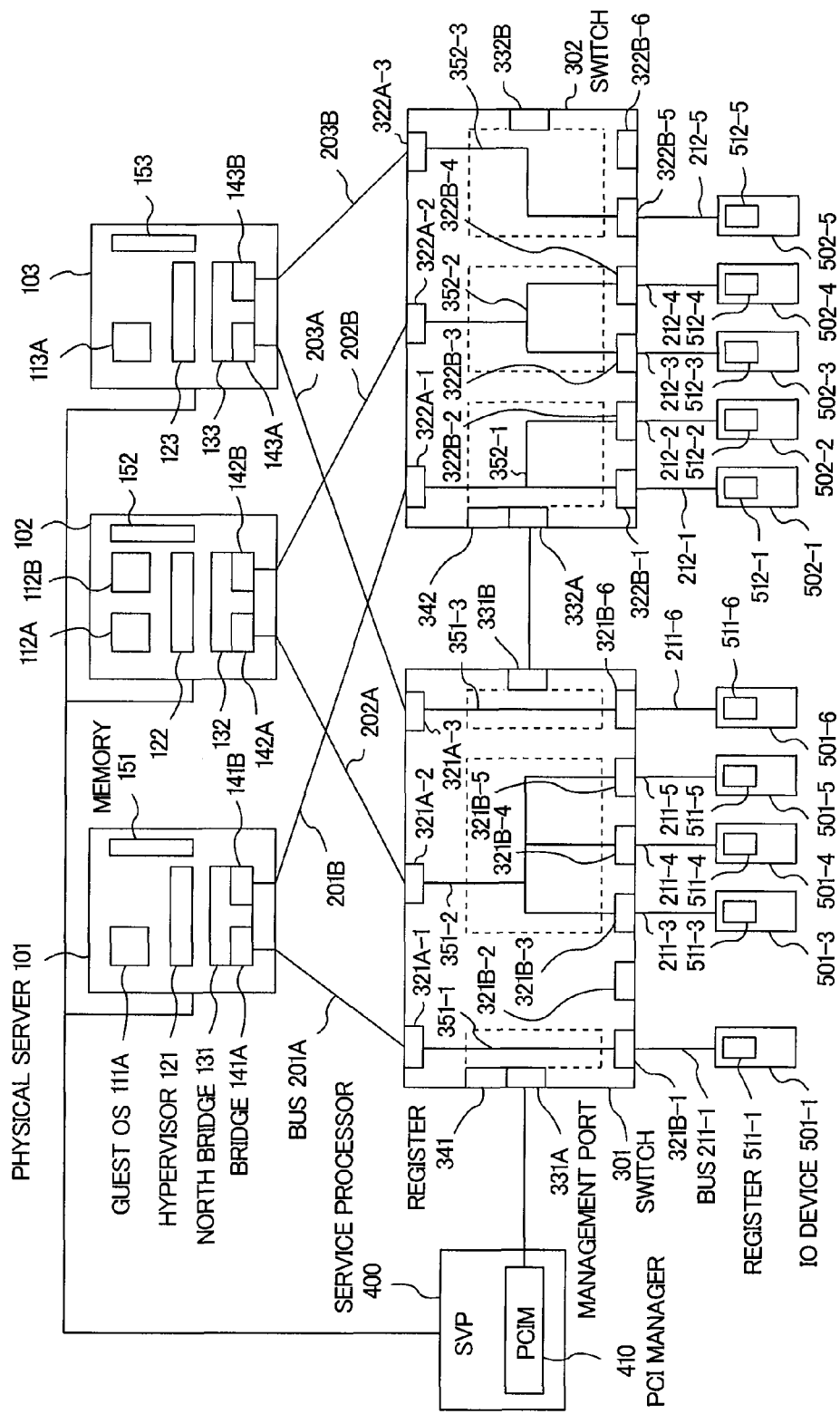
FIG. 17 is a diagram showing a configuration example of a virtual switch (Second embodiment)

In this state, as shown in the computer system of FIG. 14, it is assumed that the guest OS 111B in the physical server 101 is live migrated to the guest OS 112B in the physical server 102. In addition, the IO device that the guest OS 111B uses is 501-3 and it is to be added to the IO bridge 142A of the north bridge 132 in the physical server 102. The switch VS table 610 (FIG. 15) and the physical bridge control table 620 (FIG. 16) are updated, and the IO device 501-3 is added to the virtual switch 351-2, as shown in FIG. 17. Moreover, since there is neither addition/reduction of the IO device nor alteration of its physical location, the switch port table 600 of FIG. 2 is not altered.

As a result, since a guest OS 112B that is live migrated from the physical server 101 to the physical server 102 in FIG. 17 accesses the IO device 501-3 without becoming aware of being connected to the virtual switch 351-2 that is connected from the IO bridge 142A, it uses the IO resource ID that was used before the migration continually. Therefore, contentions arise between the PCI bus number No. 4 of the bus 211-3 to which the IO device 501-3 used by the guest OS before the migration is connected and an MMIO address 711-1, and the PCI bus number No. 4 of the bus 211-5 to which the IO device 501-5 used at a migration destination is connected and the MMIO address 712-1. This leads to a fatal problem.

Regarding this aspect, the above-mentioned problem can be eliminated according to the second embodiment. First, in this embodiment, before the EFI/BIOS assigns the IO resource IDs, the PCI manager 410 (FIG. 3) sets up the bus number assignment management table 630 (FIG. 6). The PCI manager 410 uniquely decides a configuration of switches/IO bridges from the computer system configuration, and sets up in the bus number assignment management table 630 the primary bus number 633, the secondary bus number 634, and the subordinate bus number 635 that are necessary pieces of information to fix the IO resource IDs to be assigned to respective IO bridges/virtual bridges.

The information of the bus number assignment management table 630 that is set up is reflected on the EFI/BIOS side through the registers 341, 342 in the switches 301, 302 of FIG. 3, and the EFI/BIOS assigns the fixed IO resource IDs to the respective IO bridges/virtual bridges based on the information. Therefore, for example, when assigning the PCI bus number from the physical server 101, the bus 201A is assigned as the PCI bus number No. 1, the virtual switch 351-1 is assigned as the PCI bus number No. 2, the bus 211-1 is assigned as the PCI bus number No. 3, and the bus 211-3 is assigned as the PCI bus number No. 5.

Figure 18:
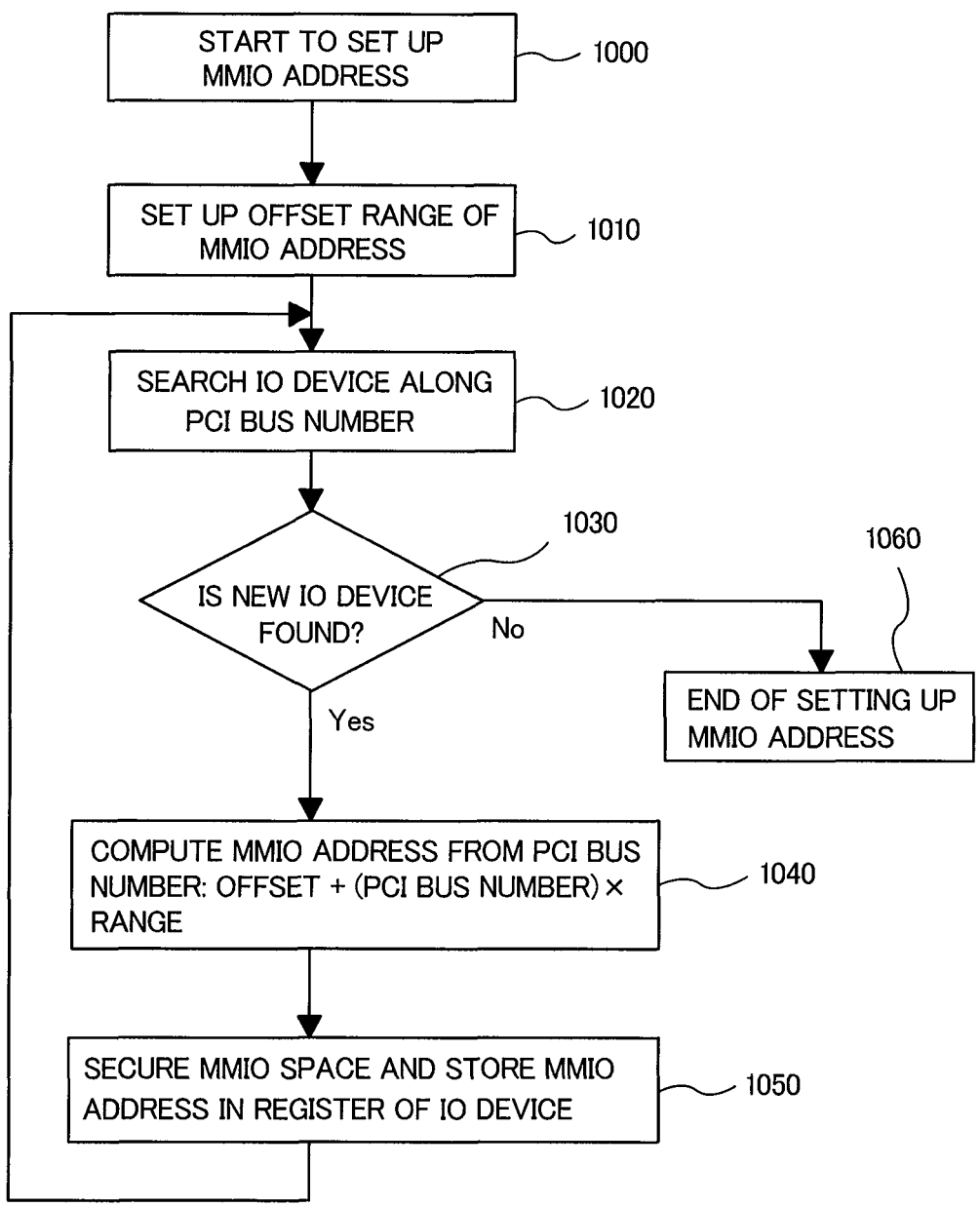
FIG. 18 is a flowchart showing a method for assigning an MMIO address.

Next, using the PCI bus numbers assigned fixedly, a fixed MMIO space is assigned to the IO device. FIG. 18 is a flowchart showing a procedure of assigning the fixed MMIO address to the IO device. At Step 1010, an offset and a range (space assigned to a single IO device) of the MMIO space that are assigned to the IO device are set up, and at Step 1020 the IO device is searched along the PCI bus number. At Step 1030, it is determined whether there is a new IO device for which the MMIO address has not been set up. If there is an IO device, the flow proceeds to Step 1040, where (offset)+(PCI bus number assigned to fixed space)×(range) is obtained as the MMIO address, and at Step 1050, the obtained MMIO address is stored in the register of the IO device. Steps 1020 to 1050 are repeated and fixed MMIO addresses are assigned to all the IO devices.

Figure 19:
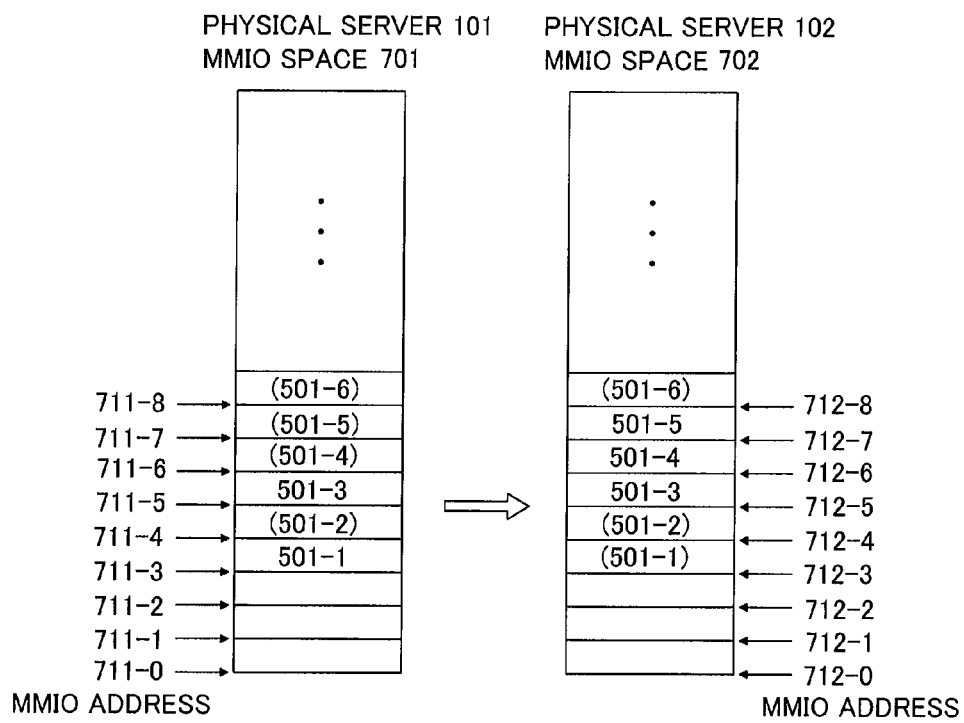
FIG. 19 is a diagram showing an example of assignment of the MMIO space according to one embodiment.

When the fixed MMIO space is assigned to the IO device based on the flowchart of FIG. 18, an MMIO address 711-3 (PCI bus number No. 3) is assigned for the IO device 501-1, and an MMIO address 711-5 (PCI bus number No. 5) is assigned for the IO device 501-3 in the MMIO space 701 of the physical server 101, as shown in FIG. 19.

Furthermore, when assigning the PCI bus numbers from the physical server 102, the bus 202A is assigned as the PCI bus number No. 1, the virtual switch 351-2 is assigned as the PCI bus number No. 2, the bus 211-4 is assigned as the PCI bus number No. 6, and the bus 211-5 is assigned as the PCI bus number No. 7. Similarly when assigning the fixed MMIO space in sequence to the IO devices, an MMIO address 712-6 (PCI bus number No. 6) is assigned for the IO device 501-4, and an MMIO address 712-7 (PCI bus number No. 7) is assigned for the IO device 501-5 in the MMIO space 702 of the physical server 102 of FIG. 19.

Next, as shown in FIG. 14, the guest OS 111B in the physical server 101 is live migrated to the guest OS 112B in the physical server 102. The IO device that the guest OS 111B uses is 501-3, and it is to be added to the IO bridge 142A of the north bridge 132 in the physical server 102. The switch VS table 610 (FIG. 15) and the switch VS bridge table 620 (FIG. 16) are updated, and the IO device 501-3 is added to the virtual switch 351-2, as shown in FIG. 17. Moreover, since there is neither addition/reduction of the IO devices nor alteration of their physical locations, the switch port table 600 of FIG. 2 is not altered.

Thus, since the guest OS 112B that is live migrated from the physical server 101 to the physical server 102 in FIG. 17 accesses the IO device 501-3 without becoming aware of being connected to the virtual switch 351-2 that is connected from the IO bridge 142A, it can use continually the IO resource ID that was used before the migration. At this time, since the IO resource ID of each of the second IO bridges 321B-3 to 321B-5 is fixed in advance, the PCI bus numbers of the buses 211-3 to 211-5 and the MMIO addresses of the IO devices 501-3 to 501-5 do not cause contention. Therefore, the guest OS that is live migrated can use the IO devices by taking over the IO resource IDs before the migration.

By fixedly assigning the IO resource IDs like this embodiment described above, even when the IO device is transparently provided to the guest OS, the live migration of the logical partitions during system operation can be performed, and the improvement of performance and reliability by the transparent accesses and the flexibility by the live migration can be attained.

What is claimed is:

1. A computer system, comprising:
a plurality of physical servers each having an IO bridge and one or more logical partitions;
a switch that has a first IO bridge for connecting with the IO bridge of the server through a bus, and a plurality of second IO bridges corresponding to slot positions; and
a bus number assignment management table for fixedly assigning mutually different PCI bus numbers to all of the plurality of second IO bridges;
wherein the bus number assignment management table is for registering information to fixedly assign the PCI bus numbers to the second IO bridges, and said second IO bridges are connected to IO devices through a bus;
wherein a virtual switch is formed in the switch by referring to the bus number assignment management table;
wherein the virtual switch connects the server and the IO devices together by a virtual bridge set up based on the first IO bridge and the second IO bridges that are connected together through a bus;
wherein the computer system further comprises a switch VS bridge table for controlling the virtual bridge set in the virtual switch;
wherein when the logical partition of a certain physical server is dynamically migrated to another physical server, the bus number assignment management table is not updated, but the switch VS bridge table is updated, and
wherein the logical partition that was migrated to the other physical server takes over the PCI bus number used before migration to use the IO device.

2. The computer system according to claim 1, further comprising:
a PCI manager for setting contents of the bus number assignment management table and of the switch VS bridge table; and
a register for storing the bus number assignment management table and the switch VS bridge table.

3. The computer system according to claim 2, wherein the register is formed in the switch.

4. The computer system according to claim 2, further comprising a management device connected to the switch and the plurality of physical servers,
wherein the management device has the PCI manager.

5. The computer system according to claim 1,
wherein each physical server has a hypervisor for setting up and controlling the one or more logical partitions.

6. The computer system according to claim 1, further comprising:
a switch port table for controlling a port to which the IO bridge in the switch is connected; and
a switch VS table for registering pieces of information that are a switch number for identifying a target switch in order to control the virtual switch in the switch, a virtual switch number for indicating a virtual switch formed in the switch, information as to whether the virtual switch is valid, a start number of a virtual bridge that constitutes the virtual switch when the virtual switch is valid, and the number of entry for indicating the number of entries of the virtual bridges;
wherein the switch VS bridge table is for registering pieces of information that include a switch number by which the target switch is identified, information for indicating as to whether a virtual bridge of a virtual bridge number in the switch is valid, direction information for indicating a direction of the virtual bridge when the virtual bridge is valid, map information showing whether it is mapped in an IO bridge of a port number, and a port number by which a port is identified; and
wherein the bus number assignment management table is for registering pieces of information about a primary bus number, a secondary bus number and subordinate bus number that are assigned to a virtual bridge in the switch for every switch number for identifying the switch;
wherein when the migration is done, contents of the switch VS table and contents of the switch VS bridge table are updated, and
wherein when an IO device is added or deleted, contents of the switch port table are updated.

7. The computer system according to claim 1,
wherein an MMIO address shows a range of MMIO space assigned to the IO devices among all the MMIO space mapped to a memory of one of the physical servers, and the MMIO addresses are fixedly assigned to the plurality of IO devices.

8. An IO resource assignment method in a computer system that includes a plurality of physical servers each having an IO bridge and one or more logical partitions; and a switch that has a first IO bridge for connecting with the IO bridge of the server through a bus and a plurality of second IO bridges corresponding to slot positions, the IO resource assignment method comprising:
fixedly assigning mutually different PCI bus numbers to all of the second IO bridges using a bus number assignment management table, which includes registering information to fixedly assign the PCI bus number to the second IO bridges, wherein said second IO bridges are connected to IO devices through a bus; and
referring to a relationship between the PCI bus numbers assigned using the bus number assignment management table and the second IO bridges and forming a virtual switch for connecting the server and the IO devices together, wherein the virtual switch connects the server and the IO devices together by a virtual bridge set up based on the first IO bridge and the second IO bridges that are connected together through a bus; and
providing a switch VS bridge table for controlling the virtual bridge set in the virtual switch;
wherein when the logical partition of a certain physical server is dynamically migrated to another physical server, the bus number assignment management table is not updated, but the switch VS bridge table is updated, and
wherein the logical partition that was migrated to the other physical server takes over the PCI bus number used before migration to use the IO device.

9. The IO resource assignment method according to claim 8, wherein each physical server has a hypervisor for setting up and controlling the one or more logical partitions.

10. The IO resource assignment method according to claim 8, wherein a PCI manager sets up contents of the bus number assignment management table.

11. The IO resource assignment method according to claim 10, wherein a management device is connected to the switch and the plurality of physical servers, and wherein the management device has the PCI manager.

12. The IO resource assignment method according to claim 8, further comprising:
providing a register for storing the bus number assignment management table and the switch VS bridge table.

13. The IO resource assignment method according to claim 12, wherein the register is formed in the switch.

14. The IO resource assignment method according to claim 8, further comprising:

providing a switch port table for controlling a port to which the IO bridge in the switch is connected; and providing a switch VS table for registering pieces of information that are a switch number for identifying a target switch in order to control the virtual switch in the switch, a virtual switch number for indicating a virtual switch formed in the switch, information as to whether the virtual switch is valid, a start number of a virtual bridge that constitutes the virtual switch when the virtual switch is valid, and the number of entry for indicating the number of entries of the virtual bridges;

wherein the switch VS bridge table is for registering pieces of information that include a switch number by which the target switch is identified, information for indicating as to whether a virtual bridge of a virtual bridge number in the switch is valid, direction information for indicating a direction of the virtual bridge when the virtual bridge is valid, map information showing whether it is mapped in an IO bridge of a port number, and a port number by which a port is identified;

wherein the bus number assignment management table is for registering pieces of information about a primary bus number, a secondary bus number and subordinate bus number that are assigned to a virtual bridge in the switch for every switch number for identifying the switch;

wherein when the migration is done, contents of the switch VS table and contents of the switch VS bridge table are updated, and wherein when an IO device is added or deleted, contents of the switch port table are updated.

15. The IO resource assignment method according to claim 8, wherein an MMIO address shows a range of MMIO space assigned to the IO devices among all the MMIO space mapped to a memory of one of the physical servers, and the MMIO addresses are fixedly assigned to the plurality of IO devices.

* * * * *